US009327563B2

(12) United States Patent
Noblanc et al.

(10) Patent No.: US 9,327,563 B2
(45) Date of Patent: May 3, 2016

(54) DUAL WHEELS WITH INTERNAL AIR PASSAGEWAYS

(71) Applicant: Hutchinson, SA

(72) Inventors: Olivier L. Noblanc, Levittown, PA (US); Christopher R. Renson, Langhorne, PA (US); Peter K. Hobe, Levittown, PA (US); Larry K. Rogers, Georgetown, KY (US); Olivier Marsaly, Princeton, NJ (US)

(73) Assignee: Hutchinson, SA, Paris (FR)

( * ) Notice: Subject to any disclaimer, the term of this patent is extended or adjusted under 35 U.S.C. 154(b) by 431 days.

(21) Appl. No.: 13/896,052

(22) Filed: May 16, 2013

(65) Prior Publication Data

US 2014/0034203 A1  Feb. 6, 2014

Related U.S. Application Data

(60) Provisional application No. 61/647,968, filed on May 15, 2012.

(51) Int. Cl.
| | |
|---|---|
| *B60C 29/02* | (2006.01) |
| *B60B 11/06* | (2006.01) |
| *B60C 23/00* | (2006.01) |
| *B60C 23/04* | (2006.01) |
| *B60B 19/08* | (2006.01) |

(52) U.S. Cl.
CPC ............... *B60C 29/02* (2013.01); *B60B 11/06* (2013.01); *B60B 19/08* (2013.01); *B60C 23/003* (2013.01); *B60C 23/007* (2013.01); *B60C 23/0498* (2013.01); *B60B 2900/115* (2013.01); *B60B 2900/321* (2013.01); *B60B 2900/3312* (2013.01); *B60B 2900/541* (2013.01); *B60B 2900/731* (2013.01); *B60C 2003/005* (2013.04)

(58) Field of Classification Search
CPC ........ B60C 29/02; B60C 29/08; B60C 23/00; B60C 23/003; B60C 23/007; B60B 19/08
USPC ................... 152/427, 415; 137/224, 112, 113
See application file for complete search history.

(56) References Cited

U.S. PATENT DOCUMENTS

| | | | | |
|---|---|---|---|---|
| 2,789,617 A | * | 4/1957 | Cardi ..................... | B60C 23/004 137/265 |
| 3,037,544 A | * | 6/1962 | Gouirand .............. | B60C 23/007 137/225 |
| 3,760,859 A | * | 9/1973 | Shahan ................... | F16K 15/20 137/113 |
| 5,302,939 A | * | 4/1994 | Downs .................. | B60C 23/007 116/34 R |
| 5,313,997 A | * | 5/1994 | Bias ........................ | B60C 29/02 152/427 |
| 5,807,445 A | * | 9/1998 | Hoffmann ............. | B60C 23/007 152/415 |
| 6,733,088 B2 | * | 5/2004 | Elkow .................... | B60B 11/04 152/415 |

* cited by examiner

*Primary Examiner* — S. Joseph Morano
*Assistant Examiner* — Jean Charleston
(74) *Attorney, Agent, or Firm* — Steven R. Scott

(57) ABSTRACT

This invention describes a system to maintain equal pressure in a pair of dual tires, and also incorporates a valve mechanism that will prevent one dual wheel tire from going flat in the event the other dual wheel tire experiences a rapid air loss. Dual wheels are typically mounted on the vehicle hub with both wheel disc faces in direct contact with each other. To ensure equal pressure in both tires, this invention has air passageways machined into the wheels such that the air passageways meet at the interface between the wheels where the wheel disc faces are in direct contact. These junctions are sealed by a rubber seal or gasket. Both tires can then be inflated or deflated simultaneously through a standard air valve located on either wheel. Where a dual wheel arrangement requires the use of an intermediate piece between the dual wheels, air passageways can connect the two-piece wheels via intermediate air passageways going through the common intermediate piece. A dual pressure equalizing valve is connected to the air passageways and embedded into the wheels or intermediate piece.

20 Claims, 14 Drawing Sheets

SECTION A-A

SECTION B-B

DUAL WHEELS WITH INTERNAL AIR PASSAGEWAYS

CROSS-REFERENCE TO RELATED APPLICATIONS

This application claims an invention which was disclosed in a provisional application filed May 16, 2012, application Ser. No. 61/647,968, entitled "Dual Wheels with Internal Air Passageways". The benefit under 35 USC §119(e) of the United States provisional application is hereby claimed, and the aforementioned application is hereby incorporated herein by reference.

BACKGROUND

This invention pertains generally to the field of devices used to maintain equal pressure in a pair of dual tires—such as those typically used on trucks, buses and other types of vehicles—without the need for external hoses or piping. More specifically, the invention teaches a system by which, in the event of one tire experiencing a rapid air loss, a valve mechanism will prevent the other tire from going flat.

A major problem with dual tires is that the pressure in one dual tire is frequently different than the pressure in the mating dual tire. Pressure differences occur due to lack of maintenance, gradual leakage, and temperature differences. Even if two dual tires start with exactly the same pressure, as a vehicle is driven the tires can heat up unevenly. The inner dual is subject to brake heat and less air flow which causes the pressure in the inner dual tire to be greater than the outer dual tire.

The need for equal pressure in dual tires is well known in the industry. First, equal tire pressure improves dual tire tread life—If one dual tire has a higher pressure than the other, then the effective outside diameter of the tire will be greater. Thus, as the tires are forced to roll together, the difference in circumferences will cause the tires to drag and prematurely wear. When dual tires are maintained at an equal inflation pressure, the tread wear is reduced. Second, equal tire pressure improves fuel economy—if the tires drag due to differences in diameter, then fuel economy is reduced. Low air pressure also decreases fuel efficiency. According to Federal Motor Carrier Safety Administration (FMCSA) research, improper tire inflation, as little as 10 psi lower than the target pressure, reduces fuel economy by about one percent. Third, equal tire pressure maintains proper tire load carrying capability. For every 5 psi drop in tire pressure, a 12R22.5 tire loses 160 pounds of load carrying capability. This load must be carried by the other dual tire, which can become overloaded. Fourth, improper dual tire inflation can cause excessive tire bulge in the footprint area which can cause dual tires to rub together (or "kiss") and significantly reduce the tire life.

Consequently, there have been numerous attempts to produce systems and/or devices to alleviate the problems associated with unequal pressure in dual tires. These systems have hoses that connect to the valve stems of each wheel. The other ends of the hoses connect to a valve that equalizes the pressure in the dual tires and provides a single point for tire inflation. In the event of a tire or hose blowout, the valve will close off the good tire from going flat.

However, though effective, there are several disadvantages to these systems. First, the valve and hoses used in these products are bulky. The weight of the valve and hoses add extra weight to the vehicle, and can cause imbalance in the assembly. Second, the valve and hoses are unsightly. Many truck owners take great pride in their vehicle to the point of buying premium polished aluminum wheels or chrome-plated wheels. But these valves and hoses detract from the wheel and vehicle appearance. Third, the valve assembly bolts to the lug, hub cap, or drive axle end. If the connection is not tight then the mounting is not secure. Fourth, the hose connections add additional potential leak points in the system. Fifth, the external valve and hoses can be snagged by brush in off-road applications, such as farm trucks, brush fire trucks, or military trucks. Sixth, the valve and hoses make the wheels difficult to clean. Seventh, the equalizing valve and hoses must be removed before removing the duals for service. Eighth, different mounting brackets are needed to mount the equalizing valve to various wheel and hub configurations. Previous devices in the field of the invention had even more disadvantages than the current art devices just described.

In contrast to the foregoing, the new design taught herein not only equalizes dual tire pressures, but also isolates a good tire from a bad tire in case of a blow-out or broken hose. This design can sense low the pressures or over-pressurized conditions. However, it does not necessarily utilize electronics to equalize pressure, and thus reliability is improved. None of the previous devices, systems and/or other attempts to alleviate the problems associated with unequal pressure in a pair of dual tires has fully satisfied the needs in the field of the invention, or anticipates the unique features and advantages of the instant invention.

SUMMARY AND OBJECTS

In view of the foregoing, it is an object of this invention to provide improved dual wheels with balanced pressures that significantly reduce the number of components and reduce the potential for leaks. Fewer components also reduce the cost, weight, and complexity of the system. Another object of this invention is to eliminate external hoses and piping to improve wheel balance, decrease complexity, decrease assembly and disassembly time, make the assembly more robust, and make wheel end maintenance easier. Still another object of this invention is to provide an improved means to incorporate an inflation valve to provide a single point for tire inflation, and in the event of a tire blowout, an integrated valve that will close off the good tire from going flat. The integrated valve assembly decreases the risk of damage from curbs, rocks, tree and shrub branches, and the like. The integrated valve assembly reduces weight, improves wheel assembly balance while reducing the need for external mounting brackets and provides easy access to the wheels for maintenance.

The inner and outer wheels in a dual wheel configuration are typically identical one-piece wheels. Dual wheels are typically mounted on the vehicle hub with both wheel disc faces in direct contact with each other. To ensure equal pressure in both tires, this invention has air passageways machined into the wheels such that the air passageways meet at the interface between the wheels, and the junctions are sealed by a rubber seal or gasket. Both tires can then be inflated or deflated simultaneously through a standard air valve. It is also common practice in the trucking industry to use an identical wheel as a single on the front axle wheel end. In this case, the air passageway on a single wheel can be sealed by a plug.

Two-piece bolt together wheels can be configured into a dual arrangement in a similar way, but they may require the use of an intermediate piece between the dual wheels (depending on wheel geometry). Air passageways can connect the two-piece wheels in a similar manner as described above with the air passageways going through the common intermediate piece, and a plug can be used to seal off the air passageway for front singles as described above. In another configuration, two-piece wheels may be used as duals without an intermediate wheel disc. Air passageways connect the dual tire air chambers as described above. In still another configuration (not shown), demountable rims can be joined by an air passageway to maintain equal pressure in the tires.

External dual pressure equalizing valves are well known in the industry, but heretofore pressure equalizing valves have not been embedded into the wheels as part of an integral system. In this invention, an integral pressure equalizing valve is embedded in the wheels and/or an intermediate piece between the dual wheels and connects to wheel internal air passageways. This results in a robust design that reduces cost, weight, size, and eliminates the need for separate mounting brackets, but also provides the means to prevent a good tire from going flat in the event that there is a rapid pressure loss in the other tire.

DETAILED DESCRIPTION

Figure 1A:
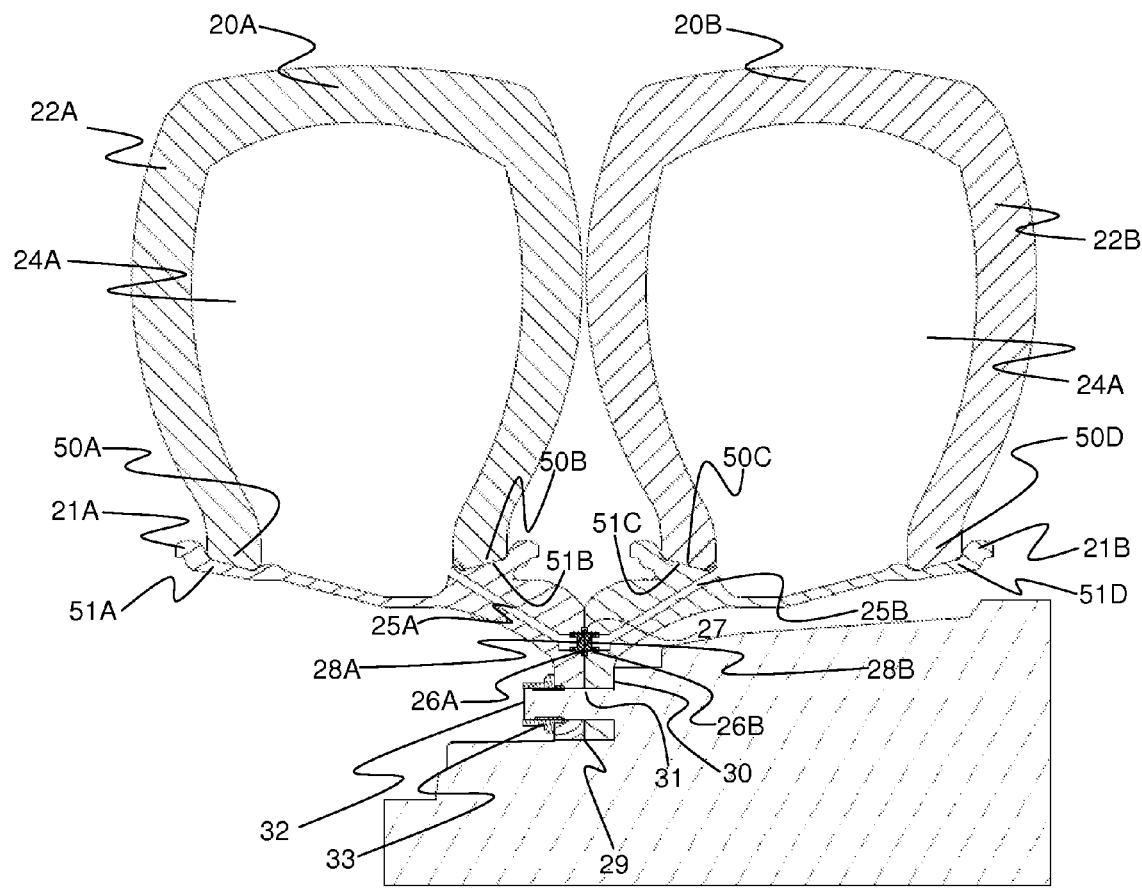
FIG. 1A is a cross sectional view of the internal passageways of two one-piece wheels and tires configured in a dual arrangement.
Figure 1B:
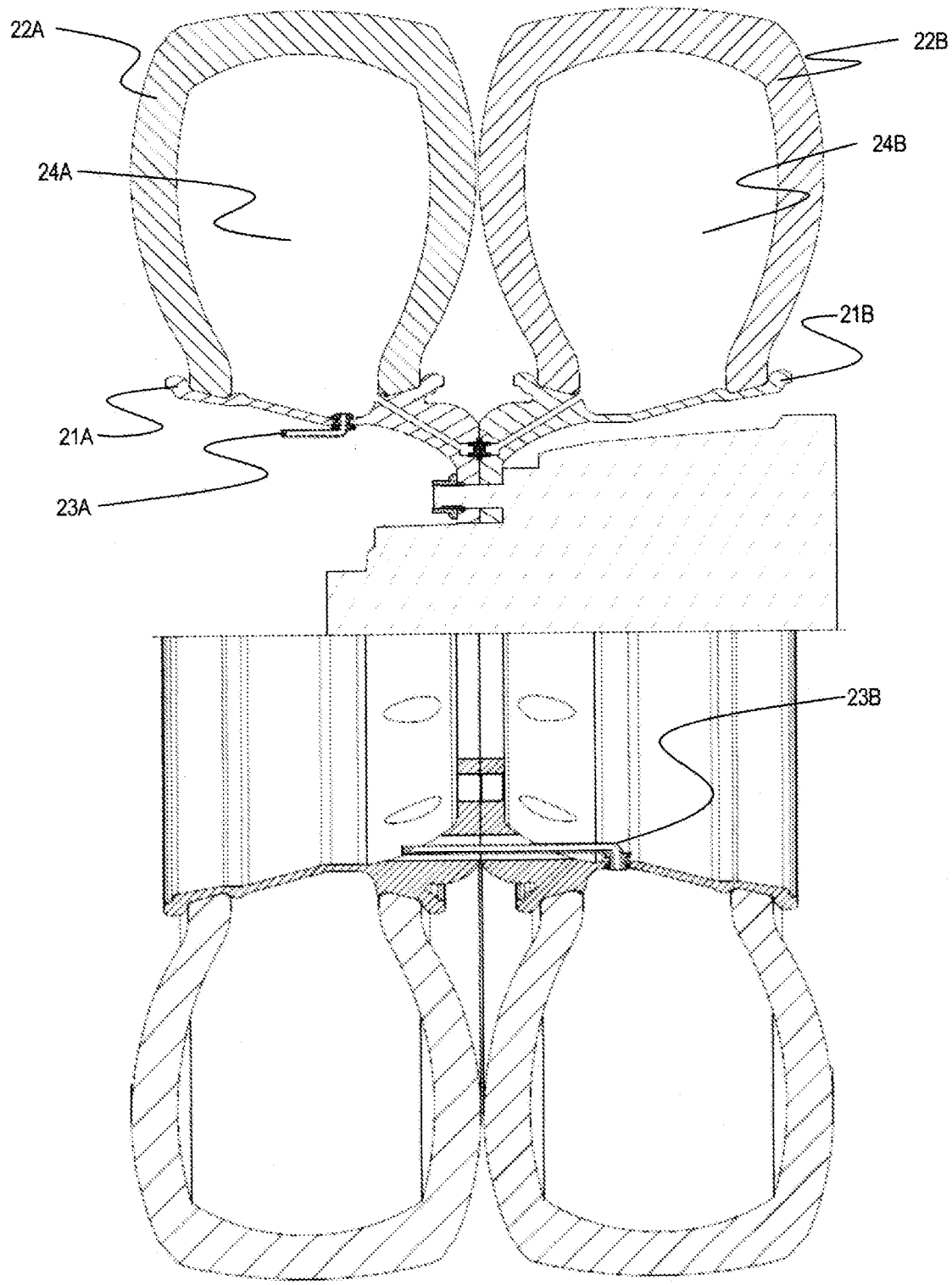
FIG. 1B is a cross sectional view of the standard inflation valves of two one-piece wheels and fires that are configured in a dual arrangement.
Figure 1C:
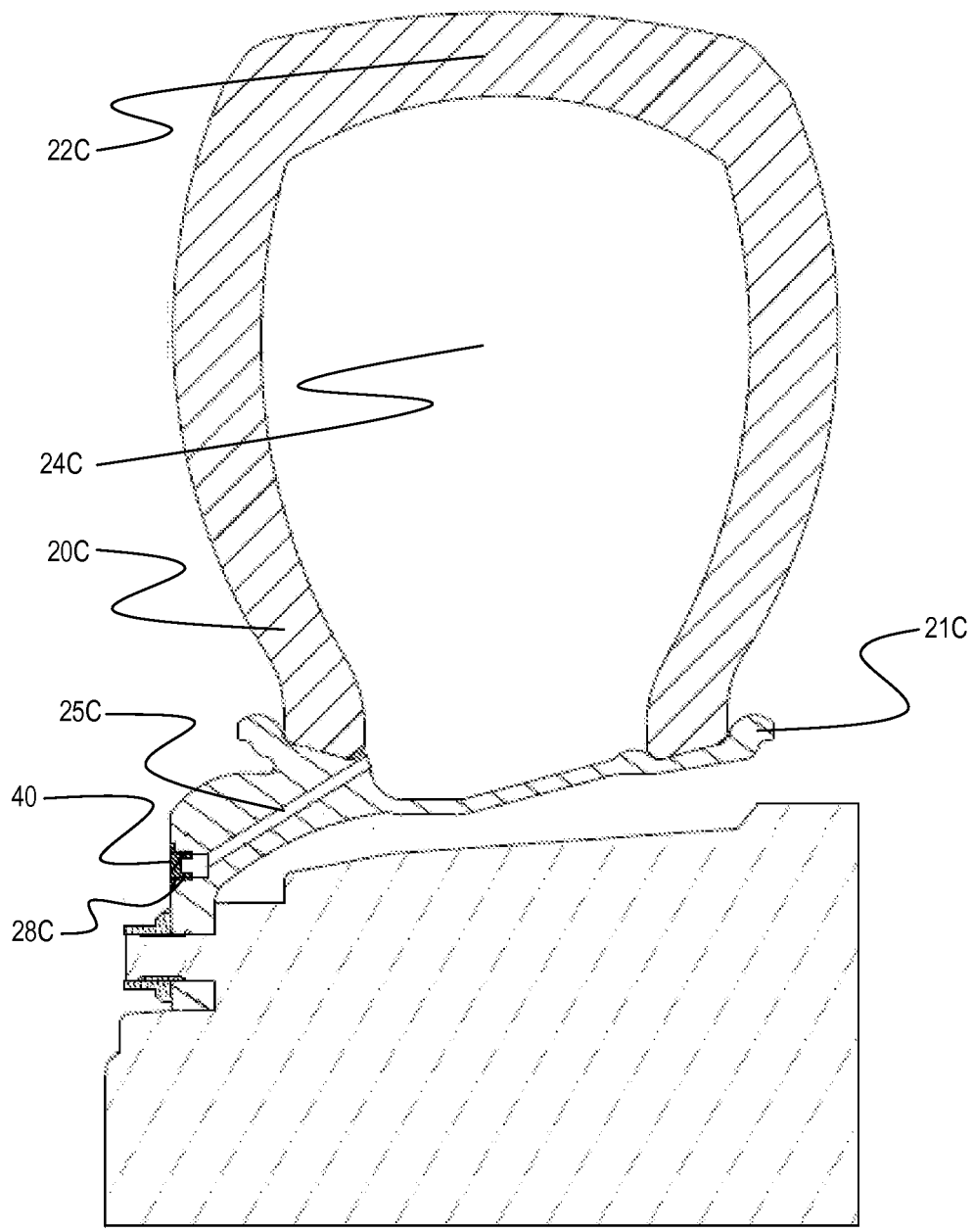
FIG. 1C is a cross sectional view of the blocked-off internal passageway of one-piece wheel as configured for a single (front wheel) applications.

In FIG. 1A tires 22A and 22B are assembled to wheels 21A and 21B in a traditional manner. During assembly, air pressure is sometimes needed to seat the tire beads 50A, 50B, 50C, and 50D to tire bead seats 51A, 51B, 51C, and 51D. Plug 40 (shown in FIG. 1C) can be temporarily installed in threads 28A and 28B to seal off air passageways 25A and 25B while the tire cavities 24A and 24B are inflated to a low pressure via tire valves 23A and 23B (shown in FIG. 1B) to seat the tire beads 50A, 50B, 50C, and 50D. Once the tire beads are seated, the air in tire cavities 24A and 24B can be exhausted via the inflation valves 23A and 23B. Plug 40 is then removed from wheels 21A and 21B.

Inner dual wheel assembly 20B and outer dual wheel assembly 20A are attached to the hub 29 with lug studs 32 and lug nuts 33. Seal 27 is placed in the outer and inner half seal grooves 26A and 26B to seal air passageways 25A and 25B. Once the inner dual wheel assembly 20B and outer wheel assembly 20A are in place, tire cavities 24A and 24B can be pressurized by injecting air through inflation valve 23A or 23B. As either tire cavity 24A or 24B is pressurized, air pressure is immediately transferred to the other tire cavity through the air passageways 25A and 25B.

During service, the pressure in both tires cavities 24A and 24B will always be equal because air can freely flow through air passageways 25A and 25B. For single wheels (FIG. 1C), the air passageway 25C is closed off by plug 40 that is installed in threads 28C. The tire is then inflated normally through the inflation valve (not shown) just like any other single wheel.

Figure 2:
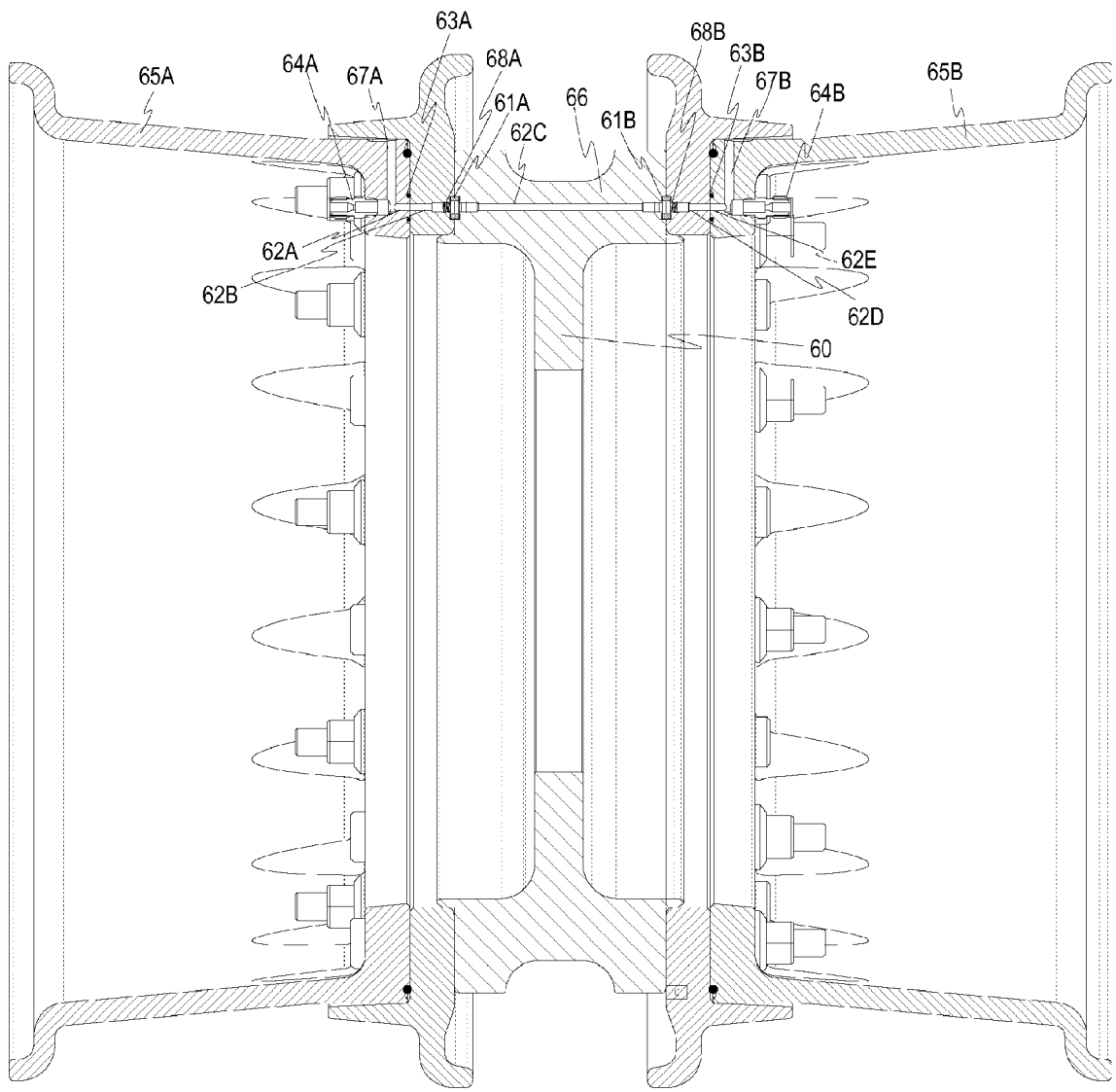
FIG. 2 is a cross sectional view of the internal passageways of two two-piece wheels and tires with an intermediate wheel disc between the dual wheels configured in a dual arrangement.

Dual wheels may also be made as 2-piece bolt together wheels 65A and 65B as shown in FIG. 2. Depending on the offset needed for the wheels, an intermediate wheel disc 66 may be placed between the wheels 65A and 65B. Air passageways 62A, 62B, 62C, 62D and 62E may be sealed with seals 63A, 61A, 61B, and 63B. Plug 40 (not shown) can be screwed into threads 68A or 68B to temporarily seal off air passageways 62B and 62D when mounting the tires (not shown) to the wheels 65A and 65B. The plugs 40 are then removed prior to assembling wheels 65A and 65B and intermediate wheel disc 66 to the vehicle hub (not shown). During assembly, seals 61A and 61B are placed between the dual wheels 65A and 65B and the intermediate wheel disc 66. Once assembled, the tires are inflated by means of inflation valve 62A. As air passes through the inflation valve 62A, it travels through the air passageways 67A, 62A, 62B, 62C, 62D, 62E and 67B to inflate both tires (not shown). In a similar manner as described above, both tires will maintain the same pressure because air can freely flow through air passageways 67A, 62A, 62B, 62C, 62D, 62E and 67B.

Figure 3:
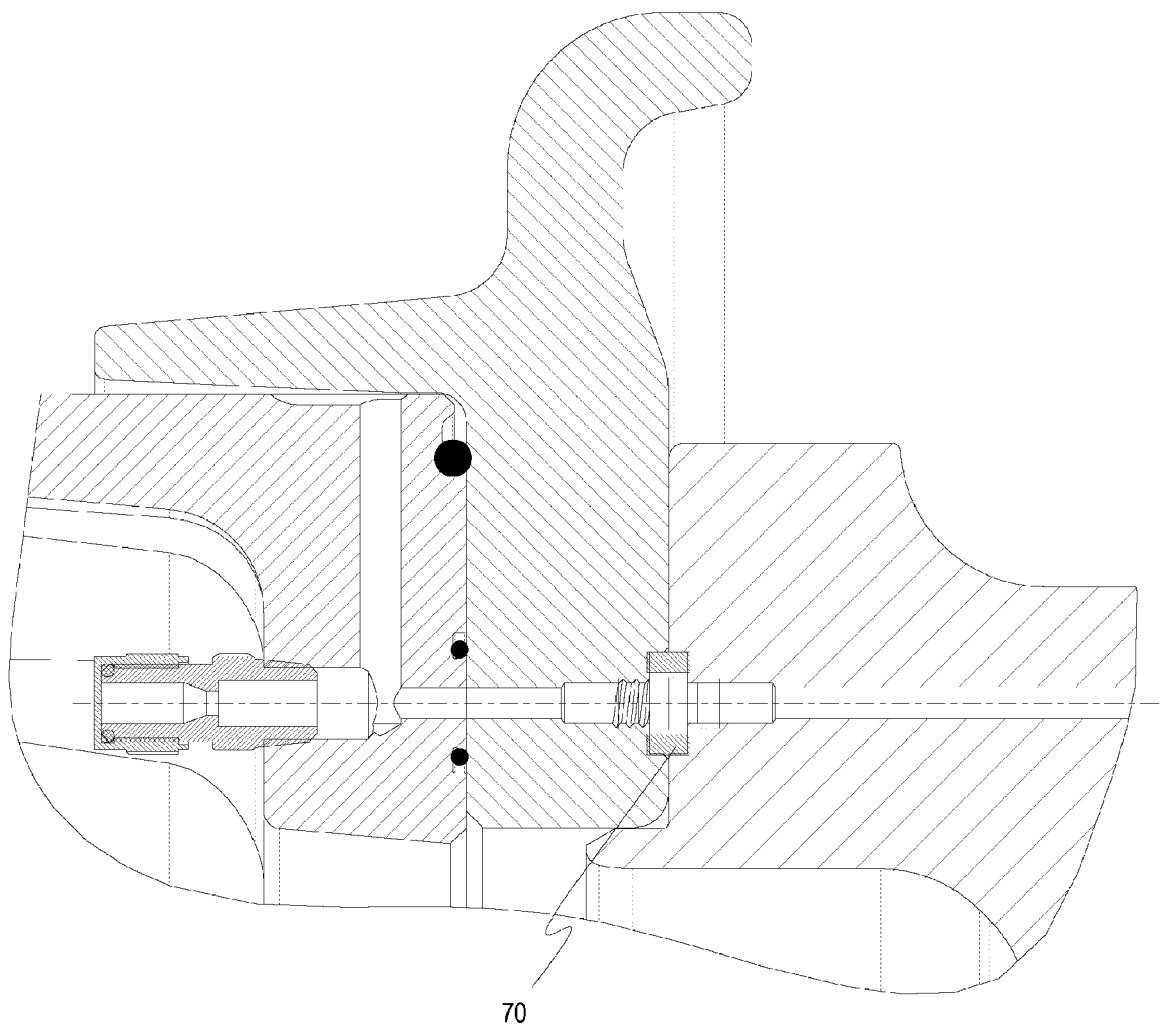
FIG. 3 is a close-up partial sectional view of the internal passageways of two-piece wheels with an intermediate piece configured for a dual wheel configuration.

Any of the seals may be of various types or configurations, and as an example, a rectangular seal 70 is shown in one location in FIG. 3 in place of an o-ring type seal. Equally obvious, a gasket or some other sealing method may be used instead of the o-ring seals shown throughout the invention.

Figure 4:
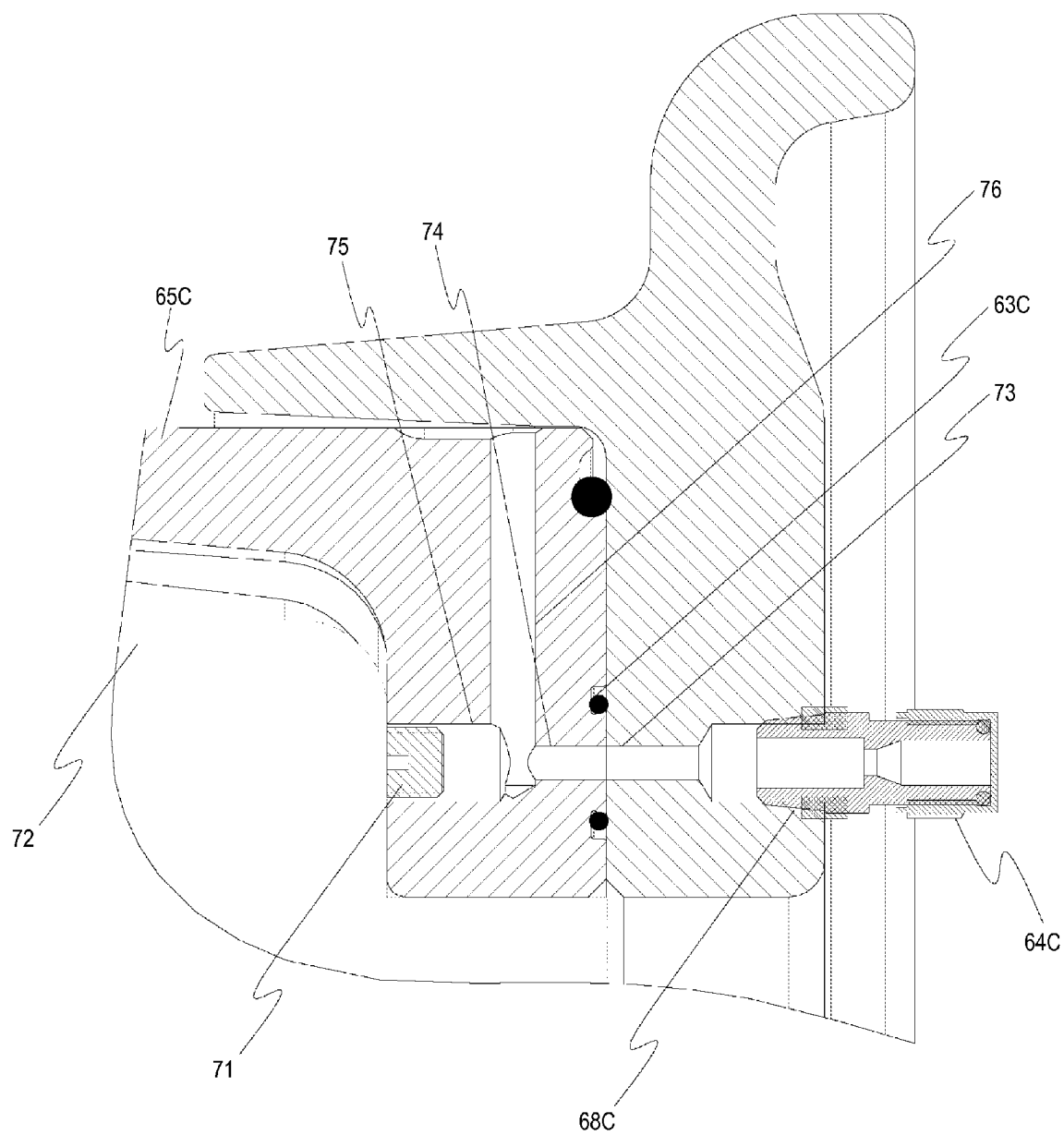
FIG. 4 is a close-up partial sectional view of the internal passageways of a two-piece wheel configured for a single wheel configuration.

FIG. 4 shows a single 2-piece wheel 65C mounted on a front hub 72. For single wheel applications, the inflation valve 64C is installed in the threads 68C, and plug 71 is used to seal off air passageway 75. The tire is pressurized by putting pressurized air through inflation valve 64C. Air flows to the tire cavity via air passageways 73, 74 and 76, and air leakage between the wheel halves is prevented due to seal 63C.

Figure 5:
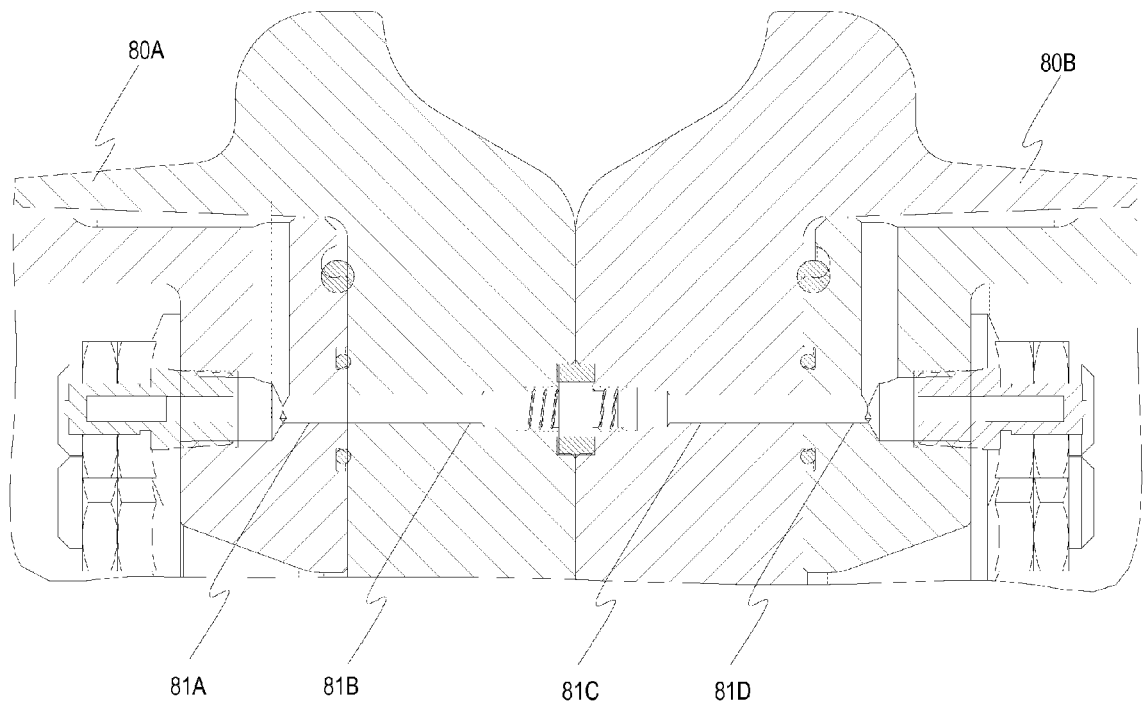
FIG. 5 is a cross sectional view of the internal passageways of two two-piece wheels and tires without an intermediate piece between the dual wheels configured in a dual arrangement.

FIG. 5 shows dual wheels may also be made as 2-piece bolt together wheels 80A and 80B and butted together without an intermediate center disc. This design functions the same as the design shown in FIGS. 2, 3, and 4. Except it has no intermediate center disc. Likewise, it is obvious that this wheel can be configured with a plug and inflation valve to function like the one shown in FIG. 4.

Figure 6:
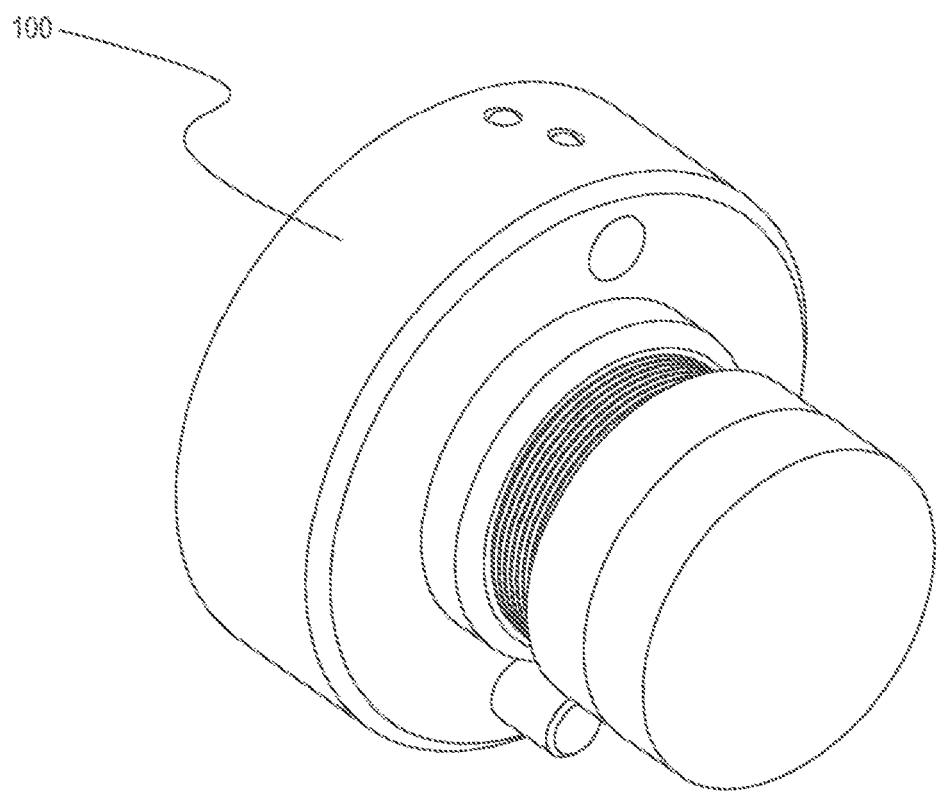
FIG. 6 is a perspective view of a cartridge-type valve that can isolate and maintain the pressure in a good tire from a bad tire in case of a blow-out.
Figure 7:
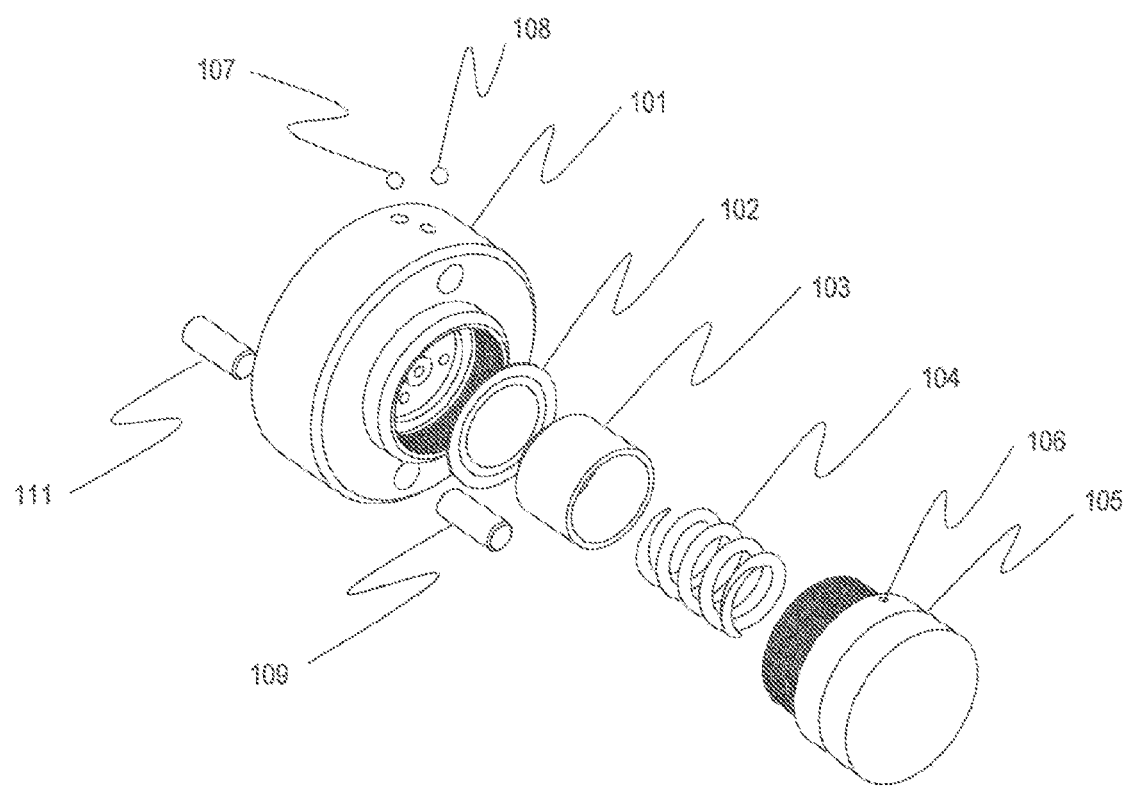
FIG. 7 is an exploded view of a cartridge-type valve that can isolate and maintain the pressure in a good tire from a bad tire in case one tire has a rapid pressure loss.
Figure 8:
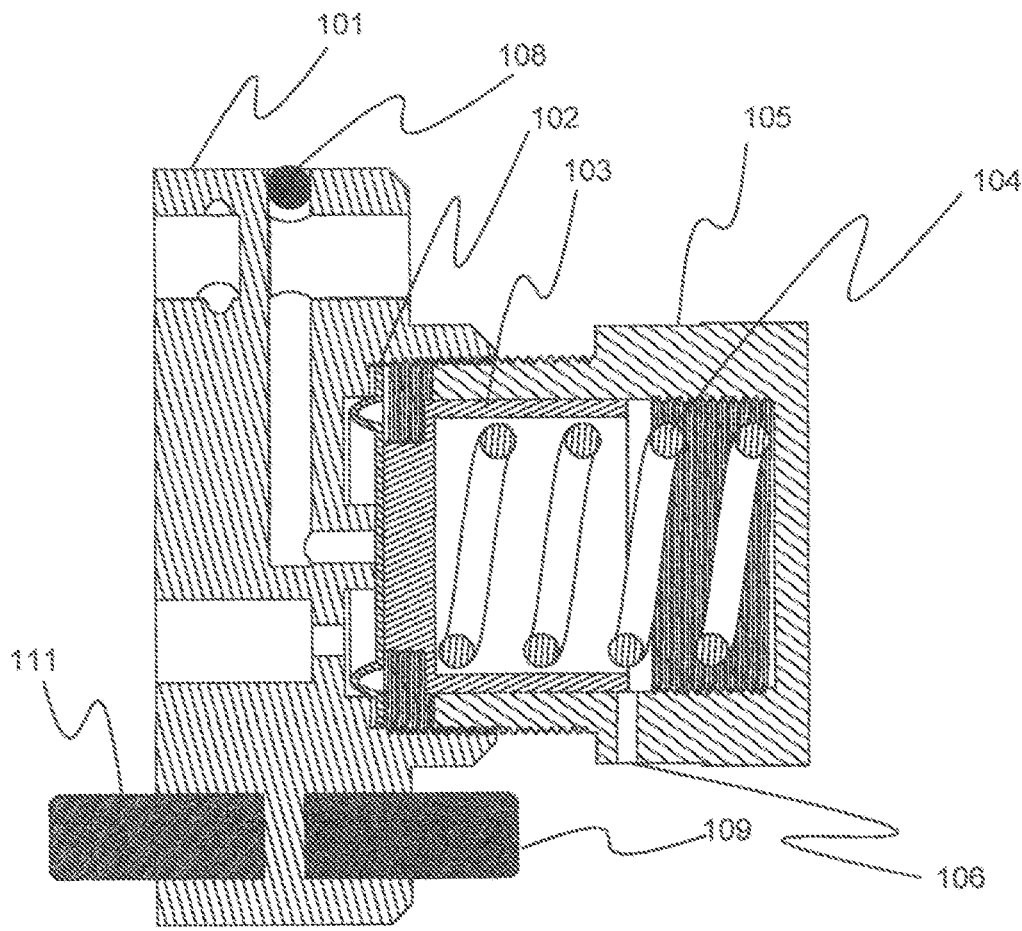
FIG. 8 is a sectional view of a cartridge-type valve that can isolate and maintain the pressure in a good tire from a bad tire in case one tire has a rapid pressure loss.
Figure 10A:
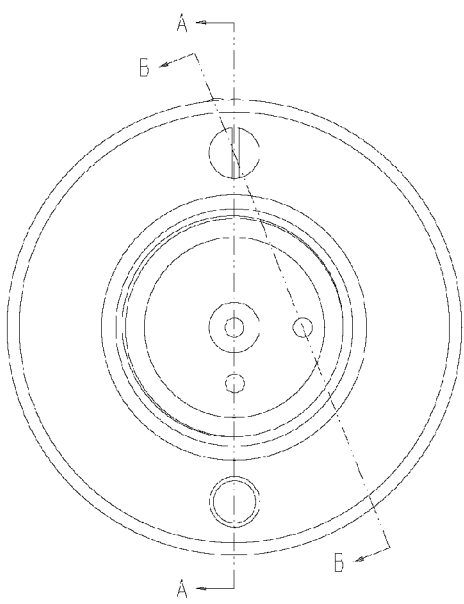
FIGS. 10A, 10B, and 10C provide further details related to the air passageways in the port end of the cartridge valve.
Figure 10B:
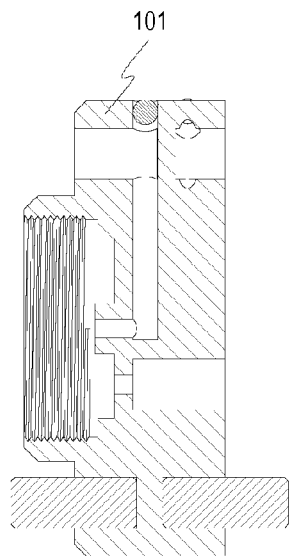
Figure 10C:
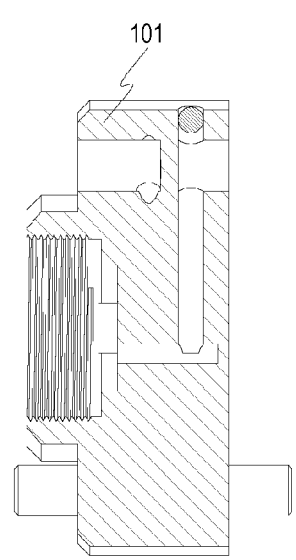

FIG. 6 shows a cartridge valve 100 that equalizes pressure between the dual tires but seals off a good tire from a bad tire in case one tire has a rapid loss (such as a tire blowout). As shown in FIGS. 7 and 8, this valve has a valve port end 101, diaphragm 102, follower 103, spring 104, valve closed end 105, vent 106, and plugs 107 and 108. The valve may consist of additional parts (not shown) to identify low, correct, or high pressure conditions or seals (not shown). FIGS. 10A, 10B and 10C show how air passageways may be connected in valve port end 101. The cartridge valve described here functions similarly to the valves described in U.S. Pat. No. 4,476,803 and other US patents, but it is a cartridge design rather than an external design.

Figure 9:
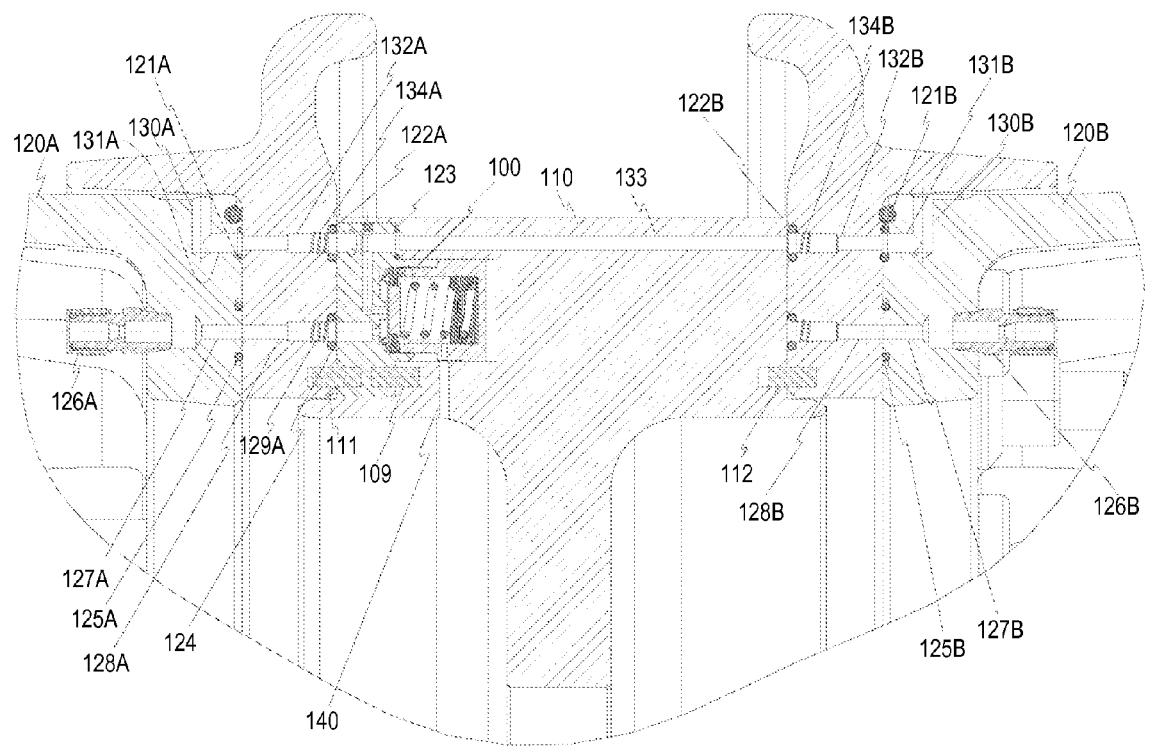
FIG. 9 is a partial cross sectional view of two two-piece wheels and tires with an intermediate piece between the dual wheels configured in a dual arrangement and with a cartridge-type valve that can isolate and maintain the pressure in a good tire from a bad tire in case one tire has a rapid pressure loss.

FIG. 9 shows the cartridge valve 100 installed in an intermediate wheel disc 110 used with two 2-piece wheels 120A and 120B. To assemble the tires (not shown) to the wheels 120A and 120B, the inflation valve 126A or 126B) may be installed in the threads 134A and 134B. Air pressure is applied through the inflation valve to seat the tire beads. Once the beads are seated, the air pressure is relieved and the inflation valves 126A and 126B are removed from threads 134A and 134B and screwed into the wheels as shown in FIG. 9.

Once the tires are installed on the wheels 120A and 120B, then inner dual wheel 120B, intermediate wheel disc 110 with cartridge valve 100, outer dual wheel 120A and various seals as shown are attached to the hub 29 (not shown) with lug studs 32 (not shown) and lug nuts 33 (not shown). Orienting pin 109 can orient the cartridge valve 100 to the intermediate wheel disc 110, and orienting pins 111 and 112 can orient the wheels 120A and 120B to the intermediate wheel disc 110. Obviously other means can be employed to orient the parts without departing from the spirit of the invention.

Once assembled, both tires can be inflated using inflation valve 126A. Air flows through air passageways 127A and 128A into the cartridge valve 100. The valve 100 allows the air to flow to air passageways 132A, 131A, 130A as well as air passageways 133, 132B, 131B, 130B and into the tires (not shown). Once the tires are inflated, the cartridge valve 100 maintains equal pressure between the dual tires but seals off a good tire from a bad tire in case one tire has a rapid pressure loss (such as a tire blowout). Seals 121A, 121B, 122A, 122B, 123, 124, and 125A seal the air passageways from leakage. Vent 140 prevents pressure build up on the closed end of the cartridge valve.

Inflation valve 126A can be used to deflate both tires simultaneously if needed. Details of the air passageways in the port end of the cartridge valve 100 are shown in FIGS. 10A, 10B, and 10C. The internal passageways maintain equal pressure in the dual tires even if a temperature differential develops between the inner and outer dual tires. The equalized pressure reduces tire drag, scuffing and wear, and improves fuel economy. Tires with balanced pressure carry the load more equally which can result in longer life in the tires and wheels. Tire pressure maintenance is much easier since one inflation valve is easy to reach and both dual tires are inflated or deflated at the same time.

The internal cartridge valve (if used) prevents a good tire from going flat in case the mating dual tire has a rapid pressure loss. The internal air passageways and cartridge valve reduce assembly imbalance to provide better ride quality, longer tire life, have less rotating mass, and a "clean appearance" that makes custom wheels easy to see and clean. The internal air passageways and cartridge valve also mean there are no external hoses, brackets, or external valve that may be damaged by rocks or snagged by brush in off-road applications.

It should be obvious that the cartridge valve 100 can be placed in one of the dual wheels to make a dual wheel configuration without the intermediate wheel disc 110. It should also be obvious that the porting configuration on the port side of the balancing valve can be made as a separate manifold piece to match the wheel internal air channels as necessary. It should also be obvious that the same design principles can be used with demountable dual rims.

Figure 11:
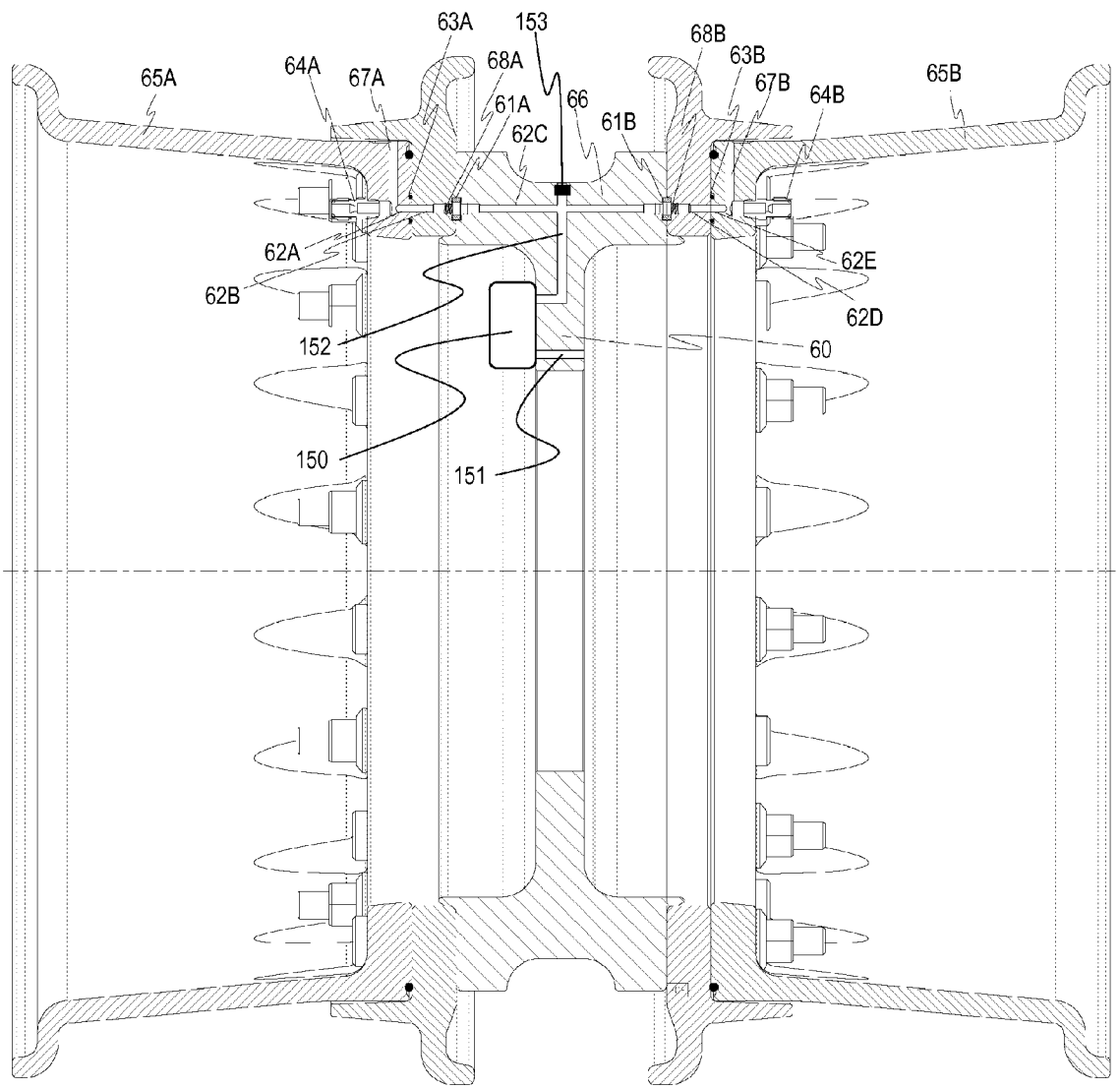
FIG. 11 is a cross sectional view of the internal passageways of two two-piece wheels and tires with an intermediate wheel disc between the dual wheels configured in a dual arrangement, and equipped with a central tire inflation system valve.

FIG. 11 shows a dual tire arrangement similar to the one in FIG. 2 except with an added central tire inflation system (CTIS) valve 150 incorporated into the design. In this embodiment the dual tires can be remotely inflated or deflated by pressing a control button on the dashboard in the cab (not shown, but well known in the art). The CTIS valve can be surface mounted, partly embedded, or fully embedded in the intermediate wheel disc 66 or either one of the wheels. In a configuration with a CTIS, a person of ordinary skill in the art will readily recognize that the spacing between the dual tires may need to be changed based on tire or wheel sizes, inflation pressures, tire load, and other factors in order to prevent damage to the tires from contacting each other.

Figure 12:
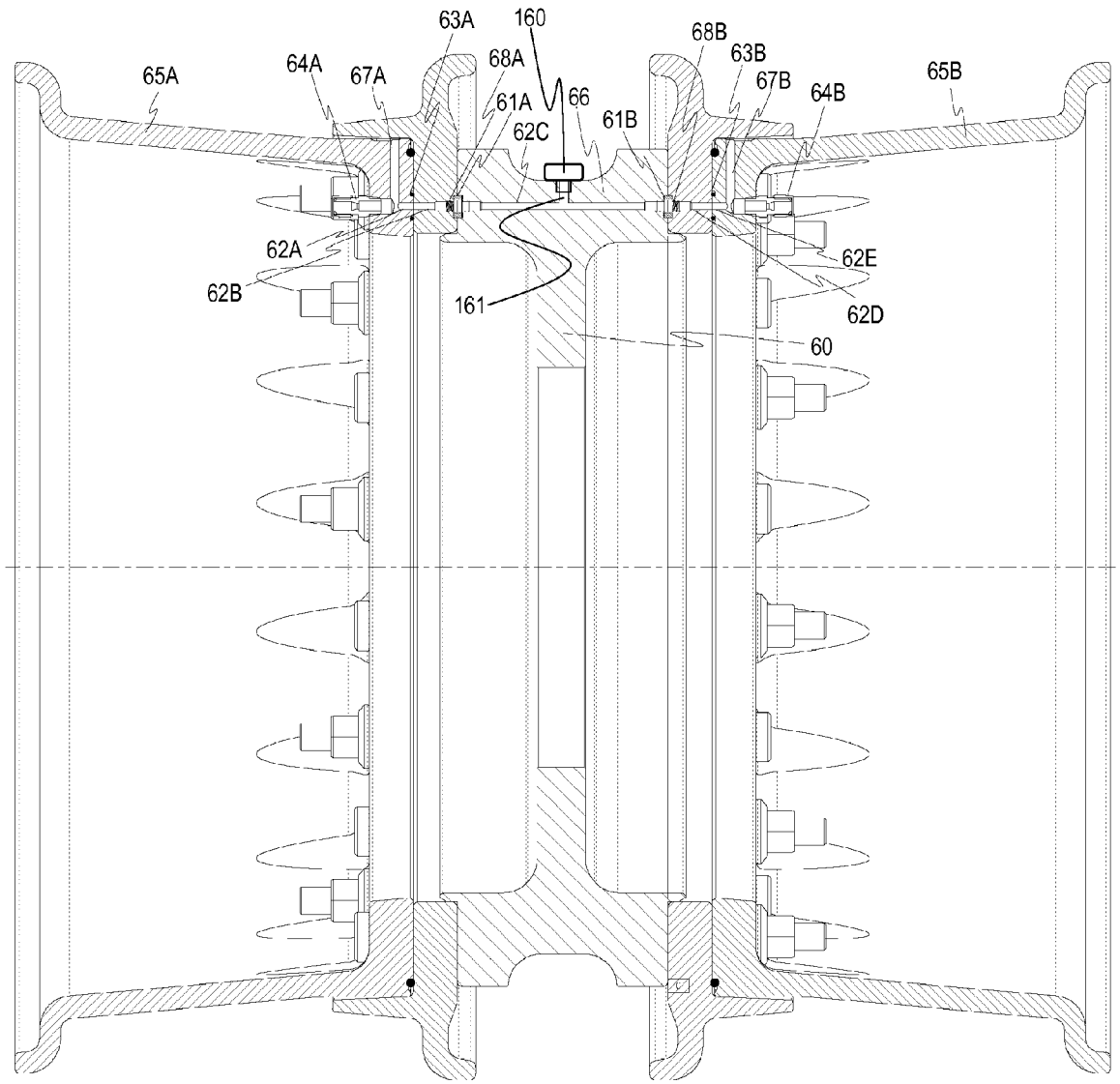
FIG. 12 is a cross sectional view of the internal passageways of two two-piece wheels and tires with an intermediate wheel disc between the dual wheels configured in a dual arrangement, and a tire pressure monitoring system sensor.

FIG. 12 shows a tire pressure monitoring system (TPMS) sensor mounted to the intermediate wheel disc 66. In this arrangement the pressure of both tires can be monitored via a TPMS. Usually the TPMS sensor must be mounted inside the tire cavity where there are harsh conditions of heat, pressure, moisture, etc. Our invention allows the TPMS sensor to be mounted outside of the tire to avoid these harsh conditions.

The following parts list for the drawing figures may be found to be of assistance in understanding more fully the concepts of our invention:

20A Outer dual wheel assembly
20B Inner dual wheel assembly
20C Single wheel assembly
21A Outer dual wheel
21B Inner dual wheel
21C Single wheel
22A Outer dual tire
22B Inner dual tire
22C Single tire
23A Outer dual wheel inflation valve
23B Inner dual wheel inflation valve
24A Outer dual tire cavity
24B Inner dual tire cavity
24C Single tire cavity
25A Outer dual wheel air passageway
25B Inner dual wheel air passageway
25C Single wheel air passageway
26A Outer dual wheel half Seal groove
26B Inner dual wheel half Seal groove
27 Seal
28A Outer dual wheel threads
28B Inner dual wheel threads
28C Front wheel threads
29 Hub
30 Hub/wheel interface
31 Wheel to wheel interface
32 Lug studs
33 Lug nuts
40 Plug 50A Tire head
50B Tire bead
50C Tire bead
50D Tire bead
51A Tire bead seat
51B Tire bead seat
51C Tire bead seat
51D Tire bead seat
60 Mounting area of intermediate wheel disc
61A Seal
61B Seal
62A Air passageway
62B Air passageway
62C Intermediate wheel disc air passageway
62D Air passageway
62E Air passageway
63A Seal
63B Seal
63C Seal
64A Inflation valve
64B Inflation valve
64C Inflation valve
65A Outer 2-piece dual wheel
65B Inner 2-piece dual wheel
65C Single 2-piece wheel
66 Intermediate wheel disc
67A Air passageway
67B Air passageway
68A Threads
68B Threads
68C Threads
70 Square seal
71 Plug
72 Front hub
73 Air passageway
74 Air passageway
75 Air passageway
76 Air passageway
80A Outer 2-piece wheel dual
80B Inner 2-piece wheel dual
81A Air passageway
81B Air passageway
81C Air passageway
81D Air passageway
100 Cartridge valve
101 Valve port end cap
102 Diaphragm
103 Follower
104 Spring
105 Valve closed end
106 Vent hole
107 Plug
108 Plug
109 Orientation pin
110 Intermediate wheel disc
111 Orientation pin
112 Orientation pin
120A Outer 2-piece dual wheel
120B Inner 2-piece dual wheel
121A Seal
121B Seal
122A Seal
122B Seal
123 Seal
124 Seal
125A Seal
125B Seal
126A inflation valve
126B Inflation valve
127A Air passageway
127B Air passageway
128A Air passageway
128B Air passageway
129A Threads
129B Threads
130A Air passageway
130B Air passageway
131A Air passageway
131B Air passageway
132A Air passageway
132B Air passageway
133 Air passageway
134A Threads
134B Threads
140 Vent
150 Central tire inflation system valve
151 Air passageway
152 Air passageway
153 Plug
160 Tire pressure monitoring system sensor
161 Air passageway Finally, although the preferred embodiments shown in the figures illustrate a cartridge valve that is fully embedded within the parts, the valve may be only partially embedded or may be mounted directly to the surface of the wheel or intermediate wheel disc. Further, although preferred embodiments are illustrated and discussed, it should be clear to any person skilled in the art of wheels and pressure balancing valves that a variety of configurations may be utilized without departing from the spirit of the invention. Thus, numerous variations are possible without deviating from and/or exceeding the spirit and scope of the invention. Moreover, various presently unforeseen or unanticipated alternatives, modifications, variations or improvements therein may be subsequently made by those skilled in the art which are also intended to be encompassed by the claims that follow.

The invention claimed is:

1. An apparatus and system for maintaining pressure in dual tires via integration of internal air passageways and valves in wheel rims for said tires, comprising:
 a pair of circular coaxially mounted wheel rims, each having formed coaxially on opposite ends thereof outwardly flaring circumferential flange sections disposed to be engaged by the beads of tubeless tires mounted on said rims;
 wall sections extending transversely of the axis of each of said rims;
 a wheel-to-wheel interface Whereby said pair of wheel rims are connected together via respective wall sections; and
 an air channel in each said wheel rim, each said air channel being positioned to be in communication with a respective tire interior and with said other air channel via said wheel-to-wheel interface at a respective juncture ends.

2. The apparatus and system described in claim 1, wherein said wheel-to-wheel interface is formed by directly joining respective wall sections abuttingly together such that respective air channels in each wheel rim are in communication via said wheel-to-wheel interface at their respective juncture ends.

3. The apparatus and system described in claim 2, further including at least one of:
 a pressure equalizing valve in communication with said air channels serving to equalize pressure between said tires, a pressure equalizing valve in communication with said air channels serving to prevent simultaneous deflation of said tires, an embedded pressure equalizing valve in communication with said air channels serving to equalize pressure between said tires, and an embedded pressure equalizing valve in communication with said air channels serving to prevent, simultaneous deflation of said tires.

4. The apparatus and system described in claim 3, further including at least one of: a pressurization stem valve in communication with said air channels whereby both of said tires can be simultaneously pressurized via said air channels, a CTI valve in communication with said air channels whereby both of said tires can be simultaneously pressurized via said air channels, and a tire pressure monitoring sensor in communication with said air channels.

5. The apparatus and system described in claim 4, further including orienting structures on at least one of said wheel rims and said intermediate wheel disc aiding in alignment of respective air channel juncture ends.

6. The apparatus and system described in claim 3, further including orienting structures on at least one of said wheel rims and said intermediate wheel disc aiding in alignment of respective air channel juncture ends.

7. The apparatus and system described in claim 2, further including at least one of: a pressurization stem valve in communication with said air channels whereby both of said tires can be simultaneously pressurized via said air channels, a CTI valve in communication with said air channels Whereby both of said tires can be simultaneously pressurized via said air channels, and a tire pressure monitoring sensor in communication with said air channels.

8. The apparatus and system described in claim 7, further including orienting structures on at least one of said wheel rims and said intermediate wheel disc aiding in alignment of respective air channel juncture ends.

9. The apparatus and system described in claim 2, further including orienting structures on at least one of said wheel rims and said intermediate wheel disc aiding in alignment of respective air channel juncture ends.

10. The apparatus and system described in claim 1, wherein said wheel-to-wheel interface is formed by indirectly joining said respective wall sections together using an intermediate wheel disc, said intermediate wheel disc having an air channel positioned to interface with and be in communication with respective air channels in each wheel rim at their respective juncture ends.

11. The apparatus and system described in claim 1, further including at least one of:

a pressure equalizing valve in communication with said air channels serving to equalize pressure between said tires, a pressure equalizing valve in communication with said air channels sewing to prevent simultaneous deflation of said tires, an embedded pressure equalizing valve in communication with said air channels serving to equalize pressure between said tires, and an embedded pressure equalizing valve in communication with said air channels serving to prevent simultaneous deflation of said tires.

12. The apparatus and system described in claim 10, further including at least one of: a pressurization stem valve in communication with said air channels whereby both of said tires can be simultaneously pressurized via said air channels, a CTI valve in communication with said air channels whereby both of said tires can be simultaneously pressurized via said air channels, and a tire pressure monitoring sensor in communication with said air channels.

13. The apparatus and system described in claim 12 further including orienting structures on at least one of said wheel rims and said intermediate wheel disc aiding in alignment of respective air channel juncture ends.

14. The apparatus and system described in claim 11, further including orienting structures on at least one of said wheel rims and said intermediate wheel disc aiding in alignment of respective air channel juncture ends.

15. The apparatus and system described in claim 10, further including at least one of: a pressurization stem valve in communication with said air channels whereby both of said tires can be simultaneously pressurized via said air channels, a CTI valve in communication with said air channels whereby both of said tires can be simultaneously pressurized via said air channels, and a tire pressure monitoring sensor in communication with said air channels.

16. The apparatus and system described in claim 14, further including orienting structures on at least one of said wheel rims and said intermediate wheel disc aiding in alignment of respective air channel juncture ends.

17. The apparatus and system described in claim 10, further including orienting structures on at least one of said wheel rims and said intermediate wheel disc aiding in alignment of respective air channel juncture ends.

18. The apparatus and system described in claim 1, further including at least one of:

a pressure equalizing valve in communication with said air channels serving to equalize pressure between said tires, a pressure equalizing valve in communication with said air channels serving to prevent simultaneous deflation of said tires, an embedded pressure equalizing valve in communication with said air channels serving to equalize pressure between said tires, and an embedded pressure equalizing valve in communication with said air channels serving to prevent simultaneous deflation of said tires.

19. The apparatus and system described in claim 18, further including at least one of: a pressurization stem valve in communication with said air channels whereby both of said tires can be simultaneously pressurized via said air channels, a CTI valve in communication with said air channels whereby both of said tires can be simultaneously pressurized via said air channels, and a tire pressure monitoring sensor in communication with said air channels.

20. The apparatus and system described, in claim 1, further including at least one of a pressurization stem valve in communication with said air channels whereby both of said tires can be simultaneously pressurized via said air channels, a CTI valve in communication with said air channels whereby both of said tires can be simultaneously pressurized via said air channels, and a tire pressure monitoring sensor in communication with said air channels.

* * * * *